No. 852,203. PATENTED APR. 30, 1907.
C. H. SHAW.
CENTRIFUGAL SEPARATOR BEARING.
APPLICATION FILED NOV. 30, 1906.

Witnesses,
C. H. Keeney.
Alma A. King.

Inventor.
Charles H. Shaw,
By Benedict, Morsell & Caldwell.
Attorneys.

THE NORRIS PETERS CO., WASHINGTON, D. C.

UNITED STATES PATENT OFFICE.

CHARLES H. SHAW, OF MILWAUKEE, WISCONSIN.

CENTRIFUGAL-SEPARATOR BEARING.

No. 852,203. Specification of Letters Patent. Patented April 30, 1907.

Application filed November 30, 1906. Serial No. 345,640.

*To all whom it may concern:*

Be it known that I, CHARLES H. SHAW, residing in Milwaukee, in the county of Milwaukee and State of Wisconsin, have invented new and useful Improvements in Centrifugal-Separator Bearings, of which the following is a description, reference being had to the accompanying drawings, which are a part of this specification.

This invention has for its object to provide a bearing for centrifugal separators which will overcome the pounding noise incident to starting. Efforts to confine the spindles of centrifugal separators in close fitting bearings to reduce the vibrations thereof seem to aggravate this objectionable feature and increase the pounding noise produced.

It is therefore an object of this invention to avoid the objectionable noise incident to starting by providing a bearing which will be yielding in its nature and will respond to the movements of the spindle while tending to restore the spindle to its proper position after such movements.

With the above and other objects in view the invention consists in the bearing herein claimed, its parts and combinations of parts and all equivalents.

Figure 1:
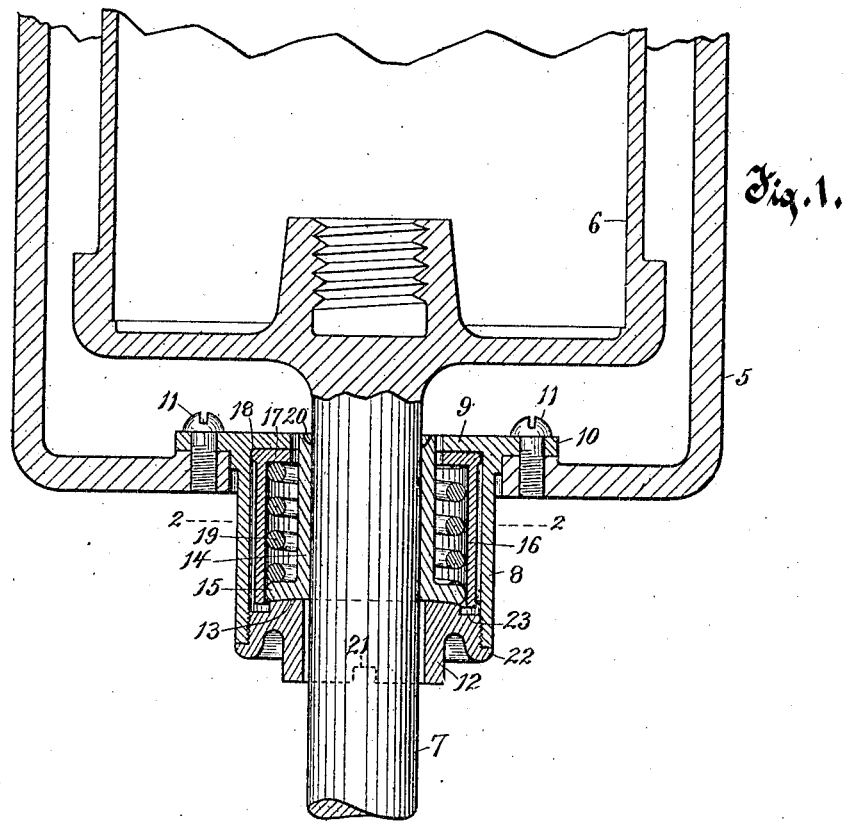
Figure 2:
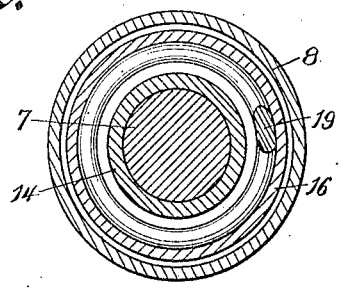

Referring to the accompanying drawings in which like characters of reference indicate the same parts in the different views:—Figure 1 is a sectional elevation of a portion of a centrifugal separator provided with a bearing constructed in accordance with this invention; and, Fig. 2 is a sectional view thereof on the plane of line 2—2 of Fig. 1.

In these drawings 5 represents the outer shell or casing of the centrifugal separator and 6 is the rotary head therein which is mounted on the vertical spindle 7 as usual, constituting the means for supporting and driving the rotary head.

A cylindrical casing 8 is provided at its upper end with an inwardly extending flange 9 and an outwardly extending flange 10, the former providing a central opening of somewhat larger diameter than the spindle 7 and the latter fitting upon the opening in the bottom of the shell or casing 5 and secured thereto by means of screws 11 or in any other desirable manner. The lower end of casing 8 is closed by a screw plug or bearing 12 which has a central opening somewhat larger in diameter than the spindle with its upper surface 13 slightly rounded spherically, approximately on the lower or thrust bearing of the spindle as a center.

A sleeve 14 snugly but loosely fits upon the spindle 7 within the housing 8 and has an outwardly extending flange 15 at its lower end whose bottom surface is rounded to correspond with the rounded surface 13 of the plug 12 against which it bears, the outer edge of the flange 15 being also rounded. A cylindrical thimble 16 surrounds the sleeve 14 with the flange 15 bearing against the interior of its lower end and has an inturned flange 17 at its upper end bearing upon the inturned flange 9 of casing 8. There is a rounded bead or projection 18 extending outwardly around the upper edge of the thimble to bear against the wall of casing 8, and constituting a pivotal bearing upon which the thimble may be inclined in any direction, owing to the space between its lower end and the inner wall of casing 8. A coil compression spring 19 surrounds the sleeve 14 and bears at one end upon the flange 15 thereof and at the other end upon the flange 17 of the thimble 16. The upper end of the sleeve 14, which projects through the openings in the thimble 16 and the flange 9, is recessed along its inner edge at 20 to receive oil for lubricating the spindle at its bearing within said sleeve.

The screw plug 12 is provided with a wrench hold 21 by means of which it may be turned into place and a flange 22 thereon limits its position by engaging the end of casing 8. A groove or rabbet 23 at the upper end of the screw plug, around the rounded bearing surface 13 prevents the engagement of the screw plug with the lower edge of thimble 16.

In operation, movements of the spindle 7 incident to the starting of the centrifugal separator are unrestrained by the bearing of this invention. Gyratory movements are permitted by the sliding of the flange 15 of sleeve 14 on the spherical bearing surface 13 of the screw plug 12, the curvature of the bearing surface being on a center approximately at the pivotal point of the spindle. In moving out of its central normal position, as shown in Fig. 1, the spindle causes flange 15 of sleeve 14 to press outwardly upon the lower edge of thimble 16, causing said thimble to rock upon its pivotal bearing formed by the bead 18 at its upper end so that the other side thereof moves downwardly to compress the spring 19. The tendency of the coil spring is of course to restore the parts to their normal position, which will be done as soon as the lateral movements of the spindle subside.

Any tendency on the part of the spindle 7 to tilt to one side or the other in the bearing is permitted by the sleeve rocking on its flange 15 against the bearing surface 13, causing the other side of the flange to lift from the engaging surface and compress the spring 19. The spring 19 also tends to restore the parts to their normal position after such movements, and while allowing the sleeve 14 and the thimble 16 to yield to the vibratory or gyratory movements of the spindle, serves to forcibly return the spindle to its normal upright position when the separator has acquired its normal operating speed and the tendency to these movements has passed.

By permitting the spindle to have the freedom allowed by the bearing of this invention the disagreeable vibration and noise usually produced on starting centrifugal separators are obviated and the separator runs quietly and smoothly at all times.

It is obvious that the principles involved in this invention are not limited to bearings for centrifugal separators, but are equally applicable to other devices having vertical shafts operating at a high speed, and therefore the scope of the invention as defined by the claims includes all such other devices to which these principles are applicable.

What I claim as my invention is;

1. A spindle bearing, comprising a pair of stationary seats, a sleeve for loosely receiving the spindle mounted on one stationary seat to have movement thereon, a thimble tiltably mounted on the other stationary seat and engaging the sleeve, and spring means for forcibly holding the sleeve and the thimble against their seats.

2. A spindle bearing, comprising a pair of stationary seats, a sleeve for loosely receiving the spindle mounted on one stationary seat to have movement thereon, a thimble tiltably mounted on the other stationary seat and engaging the sleeve, and spring means confined between the thimble and the sleeve for holding them on their seats.

3. A spindle bearing, comprising a pair of stationary seats, a flanged sleeve for loosely receiving the spindle mounted on one stationary seat to have movement thereon, a flanged thimble tiltably mounted on the other stationary seat and engaging the flange of the sleeve, and spring means confined between the thimble and the sleeve and bearing on the flanges thereof for holding them on their seats.

4. A spindle bearing, comprising a sleeve for loosely receiving the spindle, a stationary seat on which the sleeve is slidably mounted to have movement laterally of the spindle, a thimble surrounding and engaging the sleeve and pivotally seated along its periphery, and a spring confined between the thimble and the sleeve for holding the thimble on its seat and tending thereby to yieldably hold the sleeve in its normal position.

5. A spindle bearing, comprising a sleeve for loosely receiving the spindle, a stationary seat on which the sleeve is slidably mounted to have movement laterally of the spindle, there being a flange on the sleeve, a thimble surrounding the sleeve and engaging the flange at one end, said thimble having a pivotal bearing at the periphery of the other end, and a compression spring confined between the flange and the thimble for pressing the thimble on its bearing and holding the sleeve yieldingly in its normal position.

6. A spindle bearing, comprising a sleeve for loosely receiving the spindle, a cylindrical casing surrounding the sleeve and secured to the casing of the centrifugal separator, a thimble seated on the end of the casing and having a peripheral pivotal bearing against the walls thereof, there being a flange on the sleeve loosely engaging the inner walls of the thimble, a compression spring bearing against the flange and the end of the thimble, and a seat on the casing against which the sleeve is held by the spring, said sleeve being slidable on the seat laterally of the spindle.

7. A spindle bearing for centrifugal separators, comprising a sleeve for loosely receiving the spindle, a cylindrical casing surrounding the sleeve and secured to the casing of the centrifugal separator, a thimble surrounding the sleeve and bearing at one end against the end of the casing, there being a rounded bead at the bearing end of the thimble pivotally engaging the walls of the casing, and a rounded flange on the sleeve loosely engaging the inner walls of the thimble, a compression spring surrounding the sleeve and bearing on the flange and on the bearing end of the thimble, and a screw plug threaded in the casing having a bearing surface fitting the end of the sleeve on the curvature of a sphere about the bearing point of the lower bearing of the spindle as a center.

In testimony whereof, I affix my signature, in presence of two witnesses.

CHARLES H. SHAW.

Witnesses:
R. S. C. CALDWELL,
ALMA A. KLUG.